United States Patent
Trice

[15] 3,657,455
[45] Apr. 18, 1972

[54] TEMPERATURE REGULATOR
[72] Inventor: Blount C. Trice, Ponca City, Okla.
[73] Assignee: Continental Oil Company, Ponca City, Okla.
[22] Filed: Apr. 30, 1970
[21] Appl. No.: 33,464

[52] U.S. Cl..............................................................13/12
[51] Int. Cl.......................................................H05b 7/18
[58] Field of Search..................13/12; 315/307, 308; 323/4, 323/20; 356/86; 219/69 G, 109, 110, 383, 497

[56] References Cited

UNITED STATES PATENTS 3,493,664   2/1970   Kapell...........................................13/12
3,303,412   2/1967   Gately............................................323/4
3,303,411   2/1967   Gately............................................323/4

FOREIGN PATENTS OR APPLICATIONS 1,163,996   2/1964   Germany......................................13/12

Primary Examiner—J. V. Truhe
Assistant Examiner—Gale R. Peterson
Attorney—Joseph C. Kotarski, Henry H. Huth, Robert B. Coleman, Jr., William A. Mikesell, Jr., Carroll Palmer and Kemon, Palmer, Stewart and Estabrook

[57] ABSTRACT

The temperature within an analytical electrode gap is controlled by regulating the gap power supply in response to measurement of changes in the voltage across the gap and changes in the resistivity of the electrode material.

1 Claims, 1 Drawing Figure

Patented April 18, 1972
3,657,455
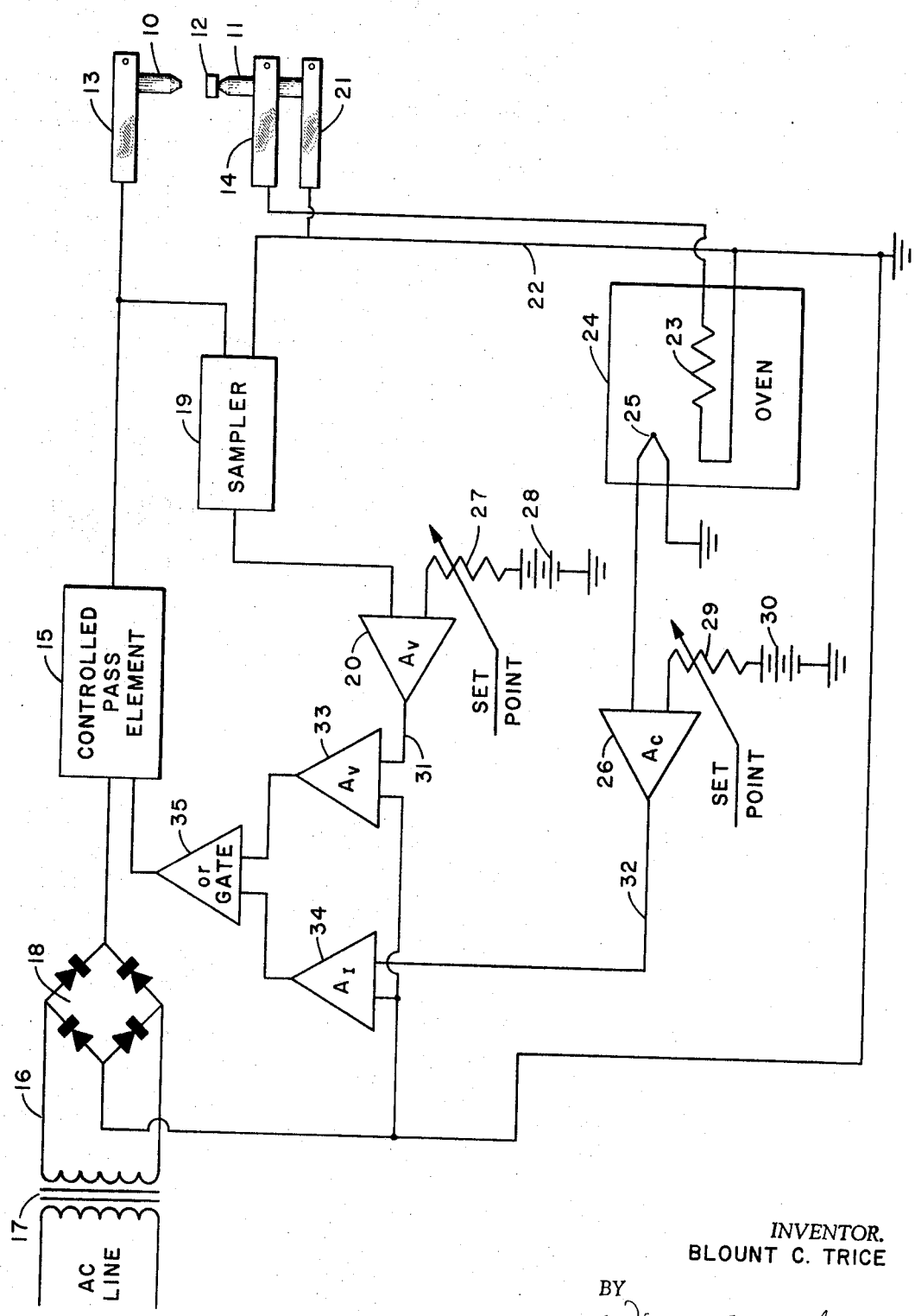
INVENTOR.
BLOUNT C. TRICE
BY William A. Mikesell Jr.
ATTORNEY

TEMPERATURE REGULATOR

DISCLOSURE

This invention relates to controlling the temperature of an analytical electrode gap, such as the gap between carbon electrodes of an emission spectrometer. In one aspect, the invention relates to maintaining the temperature of an analytical gap at a predetermined value by regulating the power supply to the gap in response to measurements of the voltage across the gap and the changes of resistivity of the electrode material.

Regulated power supplies of the prior art attempt to maintain a constant current through the analytical gap by measuring the voltage drop across a small sensing resistance in series with the gap; the effectiveness of such sensing is dependent upon dissipating the heat generated in the sensing resistance, since the coefficient of resistivity of the sensing resistor varies with temperature. Various techniques have been used to dissipate this heat, such as using sensing resistors which have large surface area or are immersed in an oil bath or which are of a decreased IR drop so as to decrease heat generation. All suffer to a greater or lesser extend, however, from variations of sensing resistor temperature and the resulting ineffective regulation due to variation in the sensing resistor resistivity.

It is accordingly an object of the present invention to provide a regulated power supply which is not dependent on temperature coefficient of resistance of a sensing resistor.

Other aspects, objects, and the several advantages of the invention will become apparent upon study of this disclosure, the appended claims, and the drawing, in which the sole FIGURE is a schematic diagram of apparatus suitable for practice of the present invention.

Referring now to the drawing, there is shown a pair of electrodes 10 and 11, such as the carbon electrodes of an emission spectrometer, one of which contains on its tip a sample cup 12. Electrodes 10 and 11 are physically supported by a pair of jaw clamps 13 and 21, respectively. Clamp 13 is connected to a controlled pass element 15, which in turn is connected to receive power from one pole of a DC power source 16, such as a transformer 17 and a rectifier bridge 18. Clamp 21 is connected directly via a conductor 22 to the opposite pole of source 16, and can also be grounded. A sampler 19 is connected to measure voltage across clamps 13 and 21 and to pass to a voltage amplifier 20 a signal proportional to the measured voltage. Auxiliary jaw clamp 14 is connected to an intermediate point of one of the electrodes, here 11, and serves to divert a small but constant proportion of the current passing across the gap between electrodes 10 and 11 from conductor 22 to a 'noise' filter, here a resistance 23 in an insulated oven 24. A current generating device, such as a thermistor 25, in proximity with resistance 23 generates a current which is filtered but proportional to that in resistor 23, and this generated current is passed to a current amplifier 26.

The signals from sampler 19 and thermistor 25 to amplifiers 20 and 26, respectively, are compared in these amplifiers to adjustable set points, such as variable resistors 27 and 28 respectively, in series with reference voltage sources 29 and 30, respectively. The resultant outputs of amplifiers 20 and 26 represent voltage and current 'error' signals in conductors 31 and 32, respectively, which are amplified by amplifiers 33 and 34, respectively. The amplilified signals from amplifiers 33 and 34 are passed to an "or gate" amplifier 35 wherein the greater of the two incoming signals, regardless of polarity, is passed, so long as it exceeds a predetermined threshhold. This passed signal, which represents in polarity and magnitude the corrective signal to be supplied to the power passing to the electrode gap, is provided as the input to controlled pass element 15, e.g. when element 15 comprises a triode with its filament connected to bridge 18 and its plate to clamp 13, the output from amplifier 35 is connected to the grid of such triode.

Amplifiers 20, 26, 33, 34 and 35 are all conventional and well-known in the art, as are power source 16, and jaw and electrode assembly 10–14. Sampler 19 can comprise simply a proportional voltage divider, such as a tapped resistor. Reference voltage sources comprising 27–30 can comprise for example standard cells connected in series with variable resistors, as shown. It will be understood that the noise filter comprising resistance 23, oven 24, and thermistor 25 can be eliminated by passing the 'sampled' current flow through clamp 14, electrode 11 and clamp 21 directly to current amplifier 26, although some sort of filter arrangement, such as that shown, is desirable to reduce noise, such as arc sputtering. As noted above, controlled pass element 15 can, in a simple embodiment, comprise a triode.

The principle of the present invention resides in using a portion of the electrode itself as an error sensing device to control the temperature of the electrodes. This is possible because the electrode carbon or other material changes its resistivity with temperature and, although the change may be relatively small, it is amplified and preferably smoothed or filtered by the thermal inertia within oven 24, and can then be used to regulate, i.e. control the set-point of, the power supply. Heat dissipation from the sensing resistor is now no longer a problem, since the object of the electrode, i.e. the sensing resistor, is to create heat. The function of amplifier 35 is to determine which error signal, the voltage error signal from amplifiers 20 and 33 or the current error signal from amplifiers 26 and 34, is of the greater magnitude and should thus control element 15.

It will be understood that various changes in the details, materials, steps, and arrangement of parts, which have been herein described and illustrated in order to explain the nature of the invention, may be made by those skilled in the art within the principle and scope of the invention.

What is claimed is:

1. A device for regulating the temperature generated by an electrical arc between two electrodes of material having a temperature coefficient of resistivity which comprises:
   a. a pair of electrode means of a material having a temperature coefficient of resistivity, said pair being positioned to exhibit an air gap between first ends thereof;
   b. electrical power supply means;
   c. means for connecting said power supply means across said electrode means;
   d. means for determining voltage across said gap;
   e. electrical resistance means operatively connected in parallel with a predetermined portion of one of said electrode means;
   f. thermoelectric generating means located adjacent said resistance means;
   g. thermal insulating means surrounding said resistance means and said generating means; and
   h. means responsive to said means for determining voltage, and to said generating means, for regulating said power supply means.

* * * * *